Nov. 14, 1967 H. P. BIRMINGHAM ET AL 3,353,153
OPTICAL GUIDANCE SYSTEM FOR PROVIDING VEHICLE
MOTION ERROR INFORMATION
Filed Jan. 22, 1965
2 Sheets-Sheet 1

INVENTORS
HENRY P. BIRMINGHAM
ALAN W. BALDWIN
BARBOUR LEE PERRY
BY
AGENT
ATTORNEY

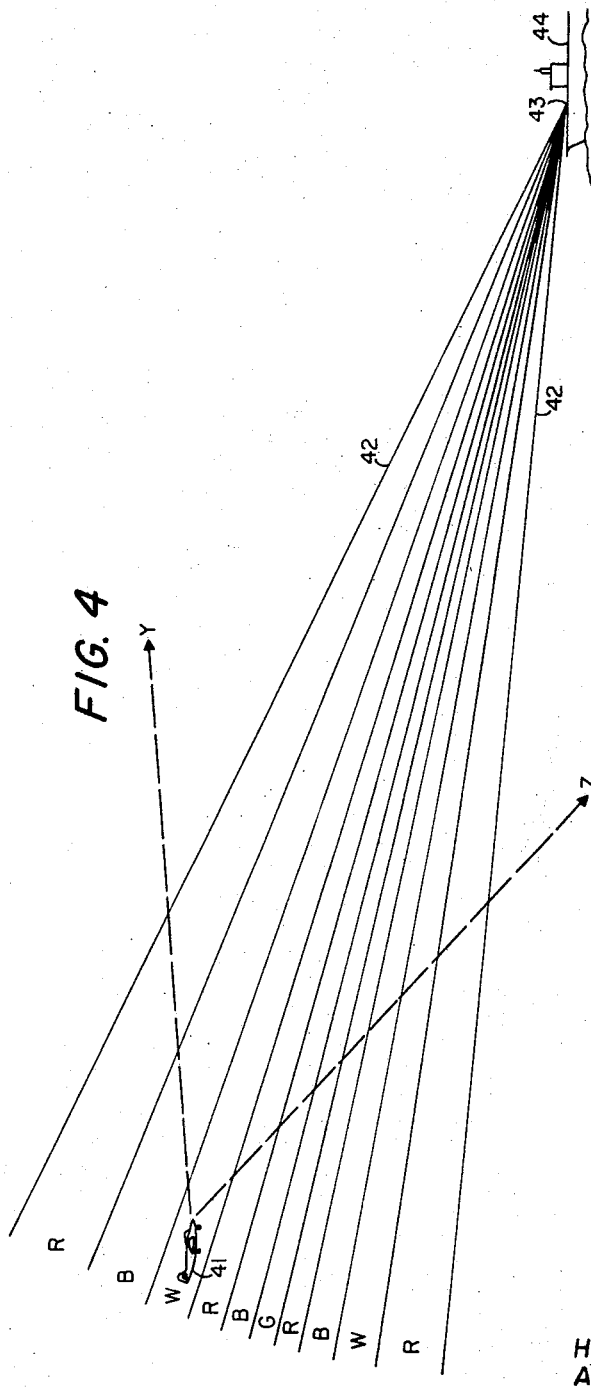

United States Patent Office 3,353,153
Patented Nov. 14, 1967

3,353,153
OPTICAL GUIDANCE SYSTEM FOR PROVIDING VEHICLE MOTION ERROR INFORMATION
Henry P. Birmingham, Washington, D.C., Alan W. Baldwin, Oxon Hill, Md., and Barbour Lee Perry, Alexandria, Va., assignors to the United States of America as represented by the Secretary of the Navy
Filed Jan. 22, 1965, Ser. No. 427,521
10 Claims. (Cl. 340—26)

ABSTRACT OF THE DISCLOSURE

An optical guidance landing system utilizing the concept of a backward projector to provide an optical indication of the appropriateness of a vehicle's motion.

---

The present invention relates to optical guidance systems, and more particularly to a system wherein vehicle motion error is optically coded and projected to the vehicle to be guided.

A study of the problems inherent in optically guiding aircraft for night carrier landings has led to the development of an optical guidance system of general application to vehicle guidance. The present system utilizes the backward viewing of a projection of light and of light coding in a changing repetitive pattern to provide error command to the subject guided. The problems in guided aircraft landing leading to the development of this guidance system, and the general description to follow are set forth in the explanation of the preferred embodiment, an aircraft landing guidance system.

Aircraft landing aboard carriers continues to be an operation with an undesirably high accident rate. This is especially true of night landings where the pilot must rely primarily on the information provided by the optical guidance landing system aboard the carrier as the visual aid in landing. The system most widely used at the present time for this purpose is the Fresnel Lens Optical Landing System (FLOLS). This system, located to one side of the flight deck, consists of a horizontal row of green datum lights and a vertical array of lenses focusing a single light indication, the so called "meatball," which appears vertically displaced from the datum lights in proportion to the landing plane's altitude error. If the landing plane is at the proper angle of approach, on the glide path, the meatball is in alignment with the row of datum lights. When the incoming plane is too high the meatball appears to be above the datum lights, and conversely, is displaced below the datum lights as seen by a pilot coming in below the glide path. The FLOLS thus aids the pilot attempting to land by providing him with altitude error information. This system and the other currently used systems, however, exhibit insufficient display gain, i.e. the ratio of observed error to actual error. Since the altitude error is indicated on the deck-mounted display by meatball displacement, the observed displacement is inversely proportional to the square of the pilot's range from the display. The effective display range of such a system is thus substantially limited. The other major inadequacy of the systems presently used is their failure to supply rate of altitude change error information. At the prescribed one mile minimum distance for beginning the final leg of the approach, the meatball displacement observed by the pilot is so small that it is virtually impossible for him to discern the rate of movement of that vertically moving indication light as he attempts to correct his position. If the pilot maneuvers his craft to correct for the indicated altitude error, his inability to determine the rate at which this correction should be made is likely to result in an oscillatory approach above and below the desired glide path.

It is a purpose of the present invention to provide that visual information to aid a pilot attempting to land which will ensure an added margin of safety in landing, while overcoming the aforedescribed limitations of the systems now employed for this purpose. To achieve this, an error signal is utilized, which is coded not by the change in position of an indicator, but by a change in color. This change indicates rate of change of position error rather than position error. The color coded source of light provides a system gain independent of range within that distance at which the light can be seen by the pilot. The rate of change of position information necessary to indicate the appropriateness of the pilot's approach is achieved by color coding the light source. The coding is in a repetitive sequence, so that the rate of change of color of the light source seen by the pilot indicates the degree of correction required, while the kind of color change witnessed indicates positive or negative correction in his rate of descent.

It is, accordingly, an object of the present invention to provide an optical indication of the appropriateness of a vehicle's motion.

Another object of the present invention is to provide a vehicle with an optical signal having adequate sensitivity for precision vehicle guidance.

Another object is to provide a guided vehicle with a visual indication of its rate of change of position error.

Another object of the present invention is to provide a method of vehicle guidance using color coded visual command.

Another object of the present invention is to provide visual indication of rate of change of position error to a landing aircraft.

Another object of the present invention is to provide a pilot, during landing, with information regarding the appropriateness of his rate of descent.

A further object of the present invention is to provide an optical indication of the appropriateness of the rate of descent of a vehicle based upon its error from glide path and its rate of change of error from glide path.

Another object is to provide color sequence coded sink rate error information to a landing aircraft.

A further object of the present invention is to provide a method of improved landing technique using color coded visual command.

Another object is to provide a vehicle optical guidance landing system having system gain independent of range.

A further object of the present invention is to provide an optical guidance landing system requiring no sensing of flight parameters.

Another object is to provide an optical guidance landing system having display sensitivity inversely proportional to angular error from glide path.

Other objects and advantages of the invention will become more fully apparent and better understood from the following description of a preferred embodiment of the invention, as illustrated in the accompanying drawings, in which:

FIG. 4 illustrates the information inherent in the present invention.

Figure 1:
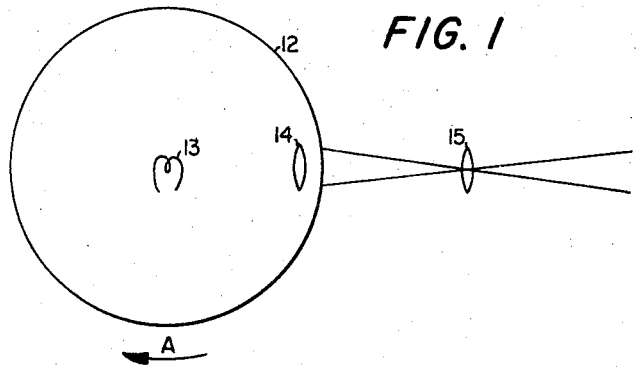
FIG. 1 illustrates an embodiment representative of the projector of the present invention.

Referring now to FIG. 1, there is shown a projector comprised of a light source 13 and a lens system represented by a condensing lens 14 and a projection lens 15. Although not shown, it is intended that the projector include a suitable housing and means to concentrate the light from source 13 into the lens system. The lens system is adjusted to focus the projection object at optical infinity. The preferred embodiment of the projection object, shown by way of illustration only, is a transparent drum 12, upon the wall of which a coded pattern is affixed. The drum rotates about the high intensity light source 13 and condensing lens 14, so that the pattern moves in the focal plane of the projecting lens 15. The drum rotates in a direction indicated by the arrow A, and is driven by a drive source not shown.

Before proceeding with a description of the actual pattern of colors on the drum wall acting as a filter to code the projected light beam in a sequence of colors, the theory of operation and the objects sought to be achieved by the present invention might better be reviewed to aid in the understanding of the pattern selected.

*The concept of the backward projector*

Figure 3:
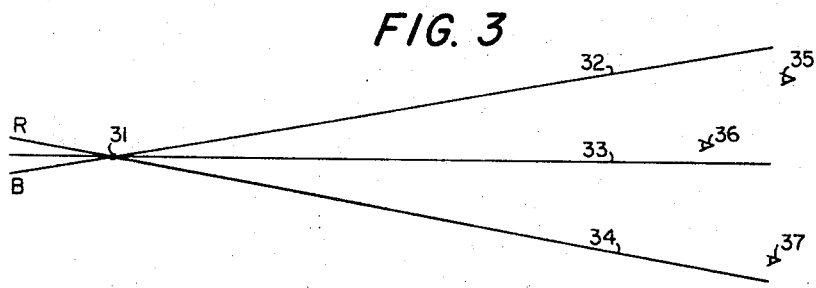
FIG. 3 is a line drawing to aid in the understanding of the present invention.

Shown in FIGS. 3 and 4 are illustrations of light beams to aid in the understanding of the present invention. Shown in FIG. 3 is a two-color beam of light generated by a light source not shown, which beam is filtered by a two-color slide indicated by R and B, where R is red and B is blue, and projected from the projector 31. The upper half of the light beam is blue, generally indicated by lines 32 and 33, while the lower portion of the beam is red and extends between lines 33 and 34. Also shown in the figure are three viewers indicated by eyes at positions 35, 36 and 37. If the light beam is focused at optical infinity, and the viewers are positioned at a sufficient distance for the beam to be in focus, it will be noted that the viewers at positions 35 and 36 will be in the blue portion of the beam and the viewer at 37 is in the red portion, due to the inversion occasioned by the projecting lens at 31. The three viewers are looking back into the projector and thus at positions 35 and 36 only blue light will be seen from the source, while the light seen by a viewer at 37 is red. The apparent color of the lens being a function of the eye's position, the need for sensing eye position by mechanical or electronic instruments is obviated. The concept of backward projection is thus very simply direct viewing of the light from the projector and not the usual viewing of an image projected onto a screen.

*The concept of the dynamic rainbow*

Again referring to FIG. 3, if line 33, dividing the blue from the red portion of the beam, were to be considered the glide path, a pilot flying into the projector at position 35 would see only blue light, and if at position 37 would see only red light. If the pilot, formerly at position 35, is now at position 36, he will still see blue light because he remains above the glide path. With blue light indicating to the pilot that he is too high and red indicating that he is too low, his correction of position from 35 to 36 has failed to produce a change in indication even though he is indeed closer to the correct angle of approach. Such a system thus lacks the ability of indicating the size of the error and it provides no error rate information. The pilot at position 36 has no indication that the blue is about to become red, i.e., that he is about to go from a positive altitude error through the proper glide path into a position of negative altitude error. The pilot thus would most probably oscillate in his flight path, until by trial and error he might zero in on the glide path. Since the two-color slide filtering the projected light is stationary there is no means for presenting altitude rate information.

Figure 2:
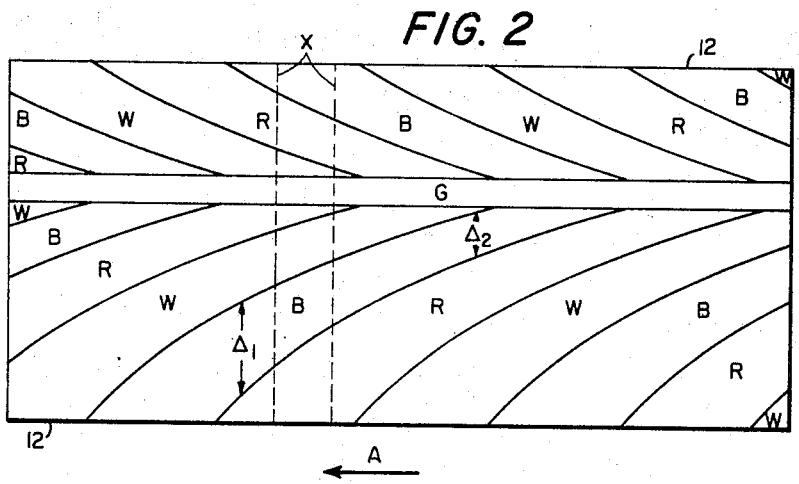
FIG. 2 shows a portion of the wall of the drum shown in FIG. 1.

FIG. 4 shows an aircraft 41 flying in a hypothetical light beam 42, which for purposes of illustration is enlarged to contain additional pencils of light in excess of the beam which would be projected by the pattern shown in FIG. 2. Beam 42 is projected from a carrier 44 by a projector 43. The light beam is divided angularly into a plurality of colored pencils, indicated from top to bottom by the letters R, B, W, R, B, G, R, B, W, and R, where R is red, B is blue, W is white, and G is green. The pilot, being in the white pencil of this static rainbow, sees the source 43 as white. The two-color slide of the FIG. 3 illustration has thus been replaced by a slide in the projector having three colors, red, blue, and white in a repetitive pattern and a single occurrence of the color green. The green colored pencil is the desired glide path and is projected at the slope necessary for touchdown at the proper angle. The three colors, red, blue, and white are repetitive in that order in the vertical display, both above and below the glide path.

If the pilot in the projected beam 42 should fly in a path generally indicated by the dashed line Y, he would see the light source appear to change from white to blue to red as he passes through the pencils of these colors. With previous knowledge that the projected beam was divided in the repeated sequence of red, blue, white, red, blue, white, from top to bottom, he would know as he saw the light change that his rate of descent was too small. As the pilot flies along the path designated by the dashed line Z, he will see the source of light change from white to red to blue, and know his rate of change of altitude, as indicated by the color sequencing is too great. In addition, if the pilot observes a single constant color, he knows he should maintain his rate of change of altitude as he flies into the light source. The same information is obtained from any position in the pattern of light pencils and at any range, limited only by the pilot's ability to see the single light on the landing area.

The hypothetical static rainbow guidance landing system of FIG. 4 provides guidance to the proper point of touchdown along any colored pencil in the display. Following the single colored pencils above the glide slope, however, might well result in a hard landing and possible damage to the aircraft. On the other hand, following a pencil below the proper glide path may result in a failure to make ramp clearance.

If instead of the static display shown in FIG. 4 the pencils of repeated color were caused to converge from above and below the desired glide path to that green pencil of light, the pilot flying in any one color would be guided into the proper angle of approach to touchdown. This then is the primary difference between the hypothetical static array shown in FIG. 4 and the dynamic display just described. The tri-colored slide in the projector 43 is continuously moving such that the red, white, and blue pencils are repeatedly cycled in toward the green pencil. The continuously converging pattern of colors will thus lead the pilot into the desired glide slope regardless of the particular color which he is following.

Since it is desirable to optimize the aircraft's approach to glide path, each dynamic light pencil is made to converge upon the green, on-glide-path pencil at a rate which is proportional to its instantaneous angle from the glide path, i.e., at an exponential rate. In addition, since it is desired that the ideal angle of approach be closely approximated, the green pencil indicating that angle is quite narrow, i.e., the green is a $\pm 0.1$ degree angular envelope about the proper slope and has a beamwidth of thirty-five feet at a range of ten thousand feet and approximately one and three-quarters feet at a range of five hundred feet, and those pencils converging on the glide slope have a width decreasing in proportion to their closeness to that path. This desired change in pencil width is also concomitant of exponential color convergence.

The transparent coded filter in the developed view of a portion of the wall of the rotating drum shown in FIG. 2 can now be readily explained. A thin horizontal stripe is shown on the drum 12 parallel to the line of drive A of the drum and approximately one-third of the distance from the top of this drum wall view. This stripe or band labeled G for green represents the proper glide slope. The remainder of the pattern shown in this figure is a series of bands labeled either W, R or B, designating white, red and blue, converging exponentially from the outer edges of the transparency into the glide slope band. As the drum 12 is driven in the direction A, a column of light indicated by dashed lines at X position, for example, would be divided from top to bottom into the colors blue, red, white, green, red, white, blue and red, each moving color converging down from the top and up the column from the bottom into the green with the continued movement of the drum. It will be noted that because of the steeper angle of the bands at the outer edge of this filter, the vertical movement will be more rapid and gradually slowing with the lessening angle at an exponential rate as the bands approach the green. Also to be noted is the change in vertical dimension of any of the red, white, or blue bands across the filter, as indicated by the dimensions $\Delta_1$ and $\Delta_2$, in the blue band shown in FIG. 2. These latter described characteristics of the exponentially arrayed stripes account for the aforedescribed movement of each light pencil within the projected beam at a rate directly proportional to their distance from the glide path while each pencil undergoes a change in vertical width in proportion to its distance from that path. It should be noted that FIG. 2 is simplified for purposes of illustration. In practice there may be several sets of color bands above and below the glide path.

In brief, then, a pilot following the guidance or command of the projected dynamic rainbow beam of the present invention interprets the changing color sequence as an indication of sink rate error, a steady green light as an indication that he is within the fixed limits of glide path, and any steady color other than green as an indication that he is off glide path but is approaching it from above or below at the proper rate. The rate of the color sequencing indicates the size of his descent rate error. That is, if the colors sequence very slowly he knows that his rate of descent is very close to that commanded by the system, while rapid color change informs the pilot that his rate of descent is quite different from that commanded by the system. In response to light change, therefore, a pilot must maneuver his craft by correcting his rate of descent until the change becomes slower and finally a constant color is observed from the projector. Once a single color is observed the pilot has performed his task by maneuvering his craft into this appropriate path and can sit back, merely maintaining his present rate of decent, knowing that even if he strays from a single color light pencil, each dynamic pencil will bring him into the ideal slope for landing.

In the developed view of the wall of drum 12 shown in FIG. 2, the green stripe representing the glide slope is positioned one-third of the distance from the top of the drum. The placement of this band is such as to obtain the desired results of having the glide slope two degrees above the bottom of the projected beam with four degrees of the pattern above that proper landing path. The placement of this band near the top of the drum and its location in the bottom third of the beam is due to the inversion caused by the lens system of the projector.

The rainbow pattern experimentally tested was projected by a 1000 watt lamp which was sighted and utilized at a range of three and one-half miles in bright sunlight. This means that a pilot flying his aircraft at 175 miles per hour obtains useful control information for approximately 1.25 minutes before touchdown. The experimental unit has a vertical field of view of four degrees above glide path and two degrees below glide path and a lateral field of plus or minus five degrees. The basic color sequence rate was chosen to be 1.5 per second, i.e. the time duration of each color is two-thirds of a second, which means that a pilot hovering at a fixed point in space, above or below the glide path, would observe the complete color sequence once every two seconds. The pilot making his approach, of course, actually observes a color sequence rate depending upon the characteristics of his flight path. In the experimental unit the green on-glide-path indication is plus or minus 0.1 degree, i.e. at a range of 10,000 feet, the pilot receiving the green indication is controlling his craft altitude with a precision of plus or minus 17.5 feet and at 500 feet from touchdown with a precision of plus or minus 0.875 foot.

Many variations in this system, depending upon the particular use, are contemplated. For example, the transparent drum could be replaced with ordinary film. The pattern itself could readily be modified to provide an indication of the outer limits of the projected beam. This could be accomplished by having the edges of the pattern contain a band parallel to the glide path band and having a series of repeated opaque and colored bars within that band which would when projected form outer pencils in the beam of flashing light of the color chosen to warn the approaching aircraft that it is dangerously high or low.

The pattern itself may be completely changed. The present invention is not limited to a particular pattern and contemplates the use of a variety of patterns coding the light beam to provide that information necessary for the guidance problem at hand. Patterns generating flashing light, for example, add other possibilities in information projection. Two flashing light optical guidance systems are described below.

The depth of flash system utilizes a two-color pattern, the colors forming two continuous bands around the drum abutting in a line representing the desired glide path. Superimposed on each band are alternating graded neutral color density filters in the form of adjacent bars spaced about the drum wall, such as that shown by dashed lines X in FIG. 2. The characteristics of these filters are such that all have the same transmission characteristic near the glide path line, but each second filter decreases in its capability to transmit light as a function of distance from this line and the other filters increase in transmission ability as a function of this distance. The resultant light beam, then, is similar to that shown in FIG. 3, because when the aircraft is close to glide path the pilot observes an apparent steady source of light. On the other hand, as his distance from glide path increases he sees an apparent light source of the same average intensity but which is flashing, the depth of flash being a function of his distance from glide path. Thus, in a vertical situation, the vehicle to be guided is supplied with information that it is too high when a deep pulsing blue is observed, for example, too low when a deep pulsing red light is observed and approaching the correct glide path when the flashing color witnessed becomes more steady.

Another flashing light system utilizes the projector shown in FIG. 1 on its side. Thus, the view presented in that figure should be considered to be a side view rather than the top view intended for illustrating the preferred embodiment. The pattern now is merely alternating opaque and transparent bars, such as that shown by dashed lines X in FIG. 2. Used as a guidance system for landing aircraft, a photo-sensitive switch is mounted in a fixed position in the projector at an angle above the horizontal equal to the desired guide path. A second light source of the searchlight variety is located above the projector at a rather large distance. On a carrier, for example, the projector may be located at the base of the island and the second light at the top. The second light is controlled by the photo-sensitive switch and, as the drum rotates in a counterclockwise direction, the higher light is turned on when a transparent bar is in line with this switch. An aircraft making its approach, therefore, will see both lights flash at the same time if it is on the proper glide slope, while a plane below that guide path will see the lower light flash first, due to the movement of the transparent bars from the bottom to the top of the projected image, followed by a flash from the upper light, beckoning the plane to come up, and a plane above the glide path will see the upper light flash first followed by a flash from the projector, beckoning it to come down.

This system thus provides a pair of flashing lights to indicate distance error from the glide path. The larger the error of the vehicle to be guided, within the angular field of the system, the longer is the time interval between the flashes from the two lights.

A further embodiment of the present invention provides the pilot with auditory information concerning his angular altitude error in the beam. Again, the projector and the rotating drum (mounted horizontally) are used to code the signal. The pattern on the drum consists of a number of horizontal strips which have vertical black lines on them to interrupt the light beam. These vertical lines are so placed that the light is interrupted with a frequency in the audio spectrum. A photocell in the aircraft receives this signal which is then amplified electronically and presented to the pilot in the form of audible sound. In other words, a number of sound tracks are superimposed on the drum. The message placed on each track depends on its angular displacement from the ideal glide slope. The message which the pilot receives is likewise a function of his angular location in the beam, i.e. the pitch of the sound heard provides this information.

It should be understood that the audio system may be readily combined with any of the previously described systems to give an added dimension in vehicle guidance.

The principles of the guidance system of the present invention have been described with reference to the preferred embodiment, an aircraft landing guidance system. These principles, backward projection of light and dynamic coding of that light in a repetitive pattern, have general application to vehicle guidance. With the projector of FIG. 1 turned on its side, bearing information, for example, may be displayed to guide ships through a narrow channel. Horizontally displayed information may also be projected from the lead aircraft in a formation to guide the other planes in maintaining their position. Moreover, such a system, projecting information the recognition of which is independent of range once the light is visible, has many applications in space whenever optical guidance of vehicles is desired.

Since various changes and modifications may be made in the practice of the invention herein described without departing from the spirit or scope thereof, it is intended that the foregoing description shall be taken primarily by way of illustration and not in limitation except as may be required by the appended claims.

The invention described herein may be manufactured and used by or for the Government of the United States of America for governmental purposes without the payment of any royalties thereon or therefor.

What is claimed and desired to be secured by Letters Patent of the United States is:

1. An optical guidance landing system for providing a pilot with a visual indication of proper glide slope and his rate of change of position error, comprising:
   projection means operationally adapted to be located on a landing area in close proximity to the desired point of touchdown, and having at least one light source and a lens system adjusted to focus a beam of light from said light source at optical infinity;
   said projection means operationally adapted to be directed at an angle to said landing area representative of said glide slope;
   coded filter means having a repetitive pattern thereon capable of indicating rate of change of position error and proper glide slope when projected to an approaching aircraft; and
   drive means operationally adapted to continuously drive said filter means through said beam of light in a predetermined direction, such that the projected light beam is caused to be altered in accordance with said pattern.

2. An optical guidance landing system as recited in claim 1, wherein said coded filter means is a transparent drum having a repetitive pattern on the wall thereof, said drum being rotated by said drive means such that said wall is caused to continuously pass through said lens system.

3. An optical guidance landing system as recited in claim 2, wherein said lens system comprises a plurality of lenses including a condensing lens and a projection lens, and the wall of said transparent drum is driven by said drive means between said condensing lens and said projection lens.

4. An optical guidance landing system as recited in claim 1, wherein the pattern on said coded filter means comprises a plurality of bands of at least three different colors exponentially converging onto a single band of a color distinct from said three different colors;
   said single band traversing said coded filter means parallel to the line of said predetermined direction of drive;
   said bands of colors being arranged in a repetitive sequence;
   whereby said beam of light filtered by said coded filter means will be angularly divided into light pencils of at least three different colors which will repeatedly converge onto a single pencil of distinct color, and a pilot flying into said beam will see a source of light from said landing area changing color, so long as his rate of descent differs from the rate of color convergence of said beam, and of constant color becoming said distinct color, representing said proper glide slope, when his rate of descent matches the rate of color convergence.

5. The method of guiding an aircraft into safe landing by projected rate of descent visual command from the landing area comprising:
   projecting a beam from said landing area of different colored light pencils which continuously converge vertically in a repeated order and at a preselected rate into a fixed pencil of distinct color, said fixed pencil being projected at an angle equal to the desired glide slope; and
   maneuvering said aircraft to remain within any pencil of color until touchdown.

6. The method of guiding an aircraft into safe landing as recited in claim 5, wherein said step of maneuvering includes adjusting the rate of sink of said aircraft to match the rate of covergence of said different colored light pencils.

7. The method of guiding an aircraft into safe landing by rate of descent visual command projected from the landing area, comprising:
   projecting a beam from said landing area angularly divided into light pencils of at least three different colors which repeatedly converge onto another fixed pencil of distinct color projected at an angle equal to the desired glide slope, such that a pilot flying an aircraft into said beam will see a source of light from said landing area changing color, so long as his rate of descent differs from the rate of pencil convergence of said beam, and of constant color becoming said distinct color when his rate of descent matches the rate of pencil convergence;
   maneuvering said aircraft to have a rate of descent equal to the rate of pencil convergence until a single color is observed by said pilot; and
   maintaining a rate of descent equal to the rate of light pencil convergence to touchdown.

8. The method of guiding a vehicle by projected rate of change of position visual command, comprising:
   projecting a light beam through a lens system adjusted to optical infinity toward said vehicle;
   continuously color coding said beam of light in a repetitive pattern to change its characteristics to provide a position rate of change command for said vehicle; and correcting the rate of change of position of said vehicle to obey the command projected.

9. The method of guiding a vehicle to a desired path by projecting visual indications to the vehicle operator, comprising:

projecting a light beam through a lens system adjusted to optical infinity toward said vehicle;

continuously coding said beam of light in a predetermined sequential pattern to change its characteristics so as to provide uninterrupted projected visual indications indicative to the vehicle operator of the position of the vehicle relative to said desired path; and correcting the movement of said vehicle in accordance with said projected visual indications to bring said vehicle into said desired path.

10. An optical guidance system projecting a color coded beam of light to a vehicle to be guided, comprising:

projection means having at least one light source and a lense system adjusted to focus a beam of light from said light source at optical infinity toward said vehicle;

color coded filter means of predetermined pattern disposed in the path of said beam of light so as to project color coded projections;

said lens system including a condensing lens and a projection lens predeterminedly oriented with said filter means; and means for continuously varying said color coded projections in predetermined sequence, such that the projected light beam is caused to be altered in accordance with said pattern.

References Cited
UNITED STATES PATENTS

| | | |
|---|---|---|
| 1,988,569 | 1/1935 | Rechtin. |
| 2,475,256 | 7/1949 | Saint _____ 340—26 X |
| 3,158,834 | 11/1964 | Evans _____ 340—26 |

NEIL C. READ, *Primary Examiner.*

A. WARING, *Assistant Examiner.*